(12) United States Patent
Cimral et al.

(10) Patent No.: US 7,158,940 B2
(45) Date of Patent: *Jan. 2, 2007

(54) METHOD AND APPARATUS FOR FACILITATING MANAGEMENT OF INFORMATION TECHNOLOGY INVESTMENT

(75) Inventors: John Cimral, West Linn, OR (US); Mark S. Lawler, Portland, OR (US); Amir Ofer, Jerusalem (IL); Avrami Tzur, Palo Alto, CA (US); Doug Yokoyama, San Francisco, CA (US)

(73) Assignee: ProSight, Ltd., Jerusalem (IL)

( * ) Notice: Subject to any disclaimer, the term of this patent is extended or adjusted under 35 U.S.C. 154(b) by 395 days.

This patent is subject to a terminal disclaimer.

(21) Appl. No.: 10/459,113

(22) Filed: Jun. 10, 2003

(65) Prior Publication Data

US 2003/0236732 A1   Dec. 25, 2003

Related U.S. Application Data

(63) Continuation of application No. 09/560,670, filed on Apr. 27, 2000, now Pat. No. 6,578,004.

(51) Int. Cl.
*G05B 19/148* (2006.01)

(52) U.S. Cl. .............. 705/7; 705/8; 705/9; 705/10; 705/11

(58) Field of Classification Search ............... 705/7, 705/8, 9, 10, 11
See application file for complete search history.

(56) References Cited

U.S. PATENT DOCUMENTS

| | | | |
|---|---|---|---|
| 4,744,028 A | 5/1988 | Karmarkar | 364/402 |
| 5,016,170 A | 5/1991 | Pollalis et al. | 364/401 |
| 5,172,313 A | 12/1992 | Schumacher | 364/401 |
| 5,303,170 A | 4/1994 | Valko | 364/578 |
| 5,321,605 A | 6/1994 | Chapman et al. | 364/402 |
| 5,331,545 A | 7/1994 | Yajima et al. | 364/401 |
| 5,406,477 A | 4/1995 | Harhen | 364/401 |
| 5,440,681 A | 8/1995 | Kudo | 395/161 |
| 5,446,895 A * | 8/1995 | White et al. | 717/101 |
| 5,493,489 A | 2/1996 | Tamaki et al. | 364/401 |
| 5,548,506 A | 8/1996 | Srinivasan | 364/401 R |
| 5,655,118 A | 8/1997 | Heindel et al. | 395/614 |

(Continued)

FOREIGN PATENT DOCUMENTS

WO   WO 94/20918   *   9/1994

(Continued)

OTHER PUBLICATIONS

Cooper et al.; Best practices for managing R&D portfolios Research Technology Management; Washington; Jul./Aug. 1998.

(Continued)

*Primary Examiner*—Jagdish N Patel
(74) *Attorney, Agent, or Firm*—Stoel Rives LLP

(57) ABSTRACT

A method and apparatus to facilitate management of IT investment includes storing data associated with performance metrics of a number of information technology (IT) projects, and generating a number of "scorecards" for a number of IT portfolios, using the stored data, with each scorecard indicating status of the IT projects of an IT portfolio relative to performance metrics, each IT portfolio having a subset of the IT projects. The method/apparatus further includes generating a number of "dashboards" for the IT projects, using also the stored data, with each dashboard graphically illustrating one or more aspects of at least one IT project, and facilitating navigation from a scorecard to a corresponding one of the dashboards for a selected IT project by a user of the scorecard through selection of a representation of the IT project.

4 Claims, 9 Drawing Sheets

U.S. PATENT DOCUMENTS

| | | |
|---|---|---|
| 5,671,360 A | 9/1997 | Hambrick et al. .......... 395/209 |
| 5,727,161 A | 3/1998 | Purcell, Jr. ................... 395/207 |
| 5,737,727 A | 4/1998 | Lehmann et al. .............. 705/7 |
| 5,765,140 A | 6/1998 | Knudson et al. ............... 705/9 |
| 5,799,286 A | 8/1998 | Morgan et al. ............... 705/30 |
| 5,826,239 A | 10/1998 | Du et al. ....................... 705/8 |
| 5,826,252 A | 10/1998 | Wolters, Jr. et al. ............ 707/1 |
| 5,848,394 A | 12/1998 | D'Arrigo et al. .............. 705/8 |
| 5,890,131 A | 3/1999 | Ebert et al. .................... 705/7 |
| 5,890,133 A | 3/1999 | Ernst ............................. 705/7 |
| 5,893,074 A | 4/1999 | Hughes et al. ................. 705/8 |
| 5,918,207 A | 6/1999 | McGovern et al. ............ 705/1 |
| 6,011,917 A | 1/2000 | Leymann et al. ........... 395/702 |
| 6,023,702 A | 2/2000 | Leisten et al. .............. 707/100 |
| 6,036,345 A | 3/2000 | Jannette et al. ........ 364/468.03 |
| 6,038,537 A | 3/2000 | Matsuoka ...................... 705/7 |
| 6,044,354 A | 3/2000 | Asplen, Jr. ..................... 705/7 |
| 6,233,493 B1 | 5/2001 | Cherneff |
| 6,308,164 B1 | 10/2001 | Nummelin et al. ............ 705/9 |

FOREIGN PATENT DOCUMENTS

WO     WO 97/07472    *   2/1997

OTHER PUBLICATIONS

Popper, Charles, "Holistic Framework for IT Governance—Program on Information Resources Policy," Center for Information Policy Research, Harvard University, Jan. 2000, 27 pgs.

Cooper, Robert G., "Portfolio Management for New Products," Perseus Books, ISBN 0-201-32814-3, 1998.

* cited by examiner

Project Data 102

Tables 202

| Proj ID | Perf Metric | Perf Metric | | | |
|---|---|---|---|---|---|
| | | | | | |
| | | | | | |
| | | | | | |
| | | | | | |
| | | | | | |
| | | | | | |
| | | | | | |

Dashboard For IT Project X 122

302a  302b
302c  302d

700

METHOD AND APPARATUS FOR FACILITATING MANAGEMENT OF INFORMATION TECHNOLOGY INVESTMENT

RELATED APPLICATION

This application is a continuation of U.S. patent application Ser. No. 09/560,670, filed Apr. 27, 2000, now U.S. Pat. No. 6,578,004.

BACKGROUND OF THE INVENTION

1. Field of the Invention

The present invention relates to the field of information management. More specifically, the present invention relates to management of Information Technology (IT) investments.

2. Background Information

Ever since the invention of computer, enterprises, business or otherwise, have used computers to improve the productivity of their workers and efficiency of their business operations. In the beginning, enterprises tended to focus in a handful of high priority operation areas, such as financial management, general ledger, payroll and so forth. While these projects were often important, and the investments were not insignificant, the investment often represented only a small portion of the enterprises' investment in infrastructure or research and development, and the overall success of the enterprises was not perceived to be critically dependent on these projects. Accordingly, except perhaps for periodic briefing for management of the organizational units that were directly impacted, senior management were seldom involved, and management of these projects were typically relegated to data processing professionals, and managed in an ad hoc manner.

Over time, continuing advances in computer and other related technology, such as networking and telecommunication, have made it economically as well as technically feasible to make available computing power to virtually every single worker of an enterprise, and support virtually every aspect of an enterprise's operations. As a result, the number as well as the type of applications have broaden, from individual worker productivity, such as word processing, email, and the like, to mission critical operations, such as reservation and flight scheduling in the case of the airline industry. The typical size and scope of many of these applications have also increased. In fact, not only the success of increasing number of conventional business enterprises are increasingly dependent on the success of their IT projects, we have new business enterprises, such as Internet access providers, Internet portals, e-Commerce companies, emerging that are made possible by information technology, which otherwise would not have existed.

With the increase in significance as well as in amount of investment, increasingly senior management of these enterprises are actively involved in the management of their enterprises' investment in IT. Unfortunately, while the significance and the investment in IT have skyrocketed in recent years, little advances have been made in the area of managing IT. Project managers, mid-level managers as well as senior executives continue to rely on a hodgepodge of non-integrated or poorly integrated individual software applications such as spreadsheet and project management applications.

Thus, increasingly there are interest and desire in having automated tools to assist management of all levels to manage these ever more critical IT projects.

SUMMARY OF THE INVENTION

A method and apparatus to facilitate management of IT investments includes, in one embodiment, storing data associated with performance metrics of a number of information technology (IT) projects, generating a number of scorecards for a number of IT portfolios, using the stored data, with each scorecard showing where IT projects of an IT portfolio stand on the performance metrics, and each IT portfolio having a subset of the IT projects. The method/apparatus further includes generating one or more investment maps of the IT portfolios, using also the stored data, with each investment map showing at least where a subset of the IT portfolios stand on a number of performance metrics. The method/apparatus further includes facilitating navigation from an investment map to a corresponding one of the scorecards for a selected IT portfolio by a user of the investment map through selection of a representation of the IT portfolio.

In another embodiment, the method/apparatus further includes generating a number of dashboards for the IT projects, using also the stored data, with each dashboard graphically illustrating one or more aspects of at least one IT project. The method/apparatus further includes facilitating navigation from a scorecard to a corresponding one of the dashboards for a selected IT project by a user of the scorecard through selection of a representation of the IT project.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Figure 1:
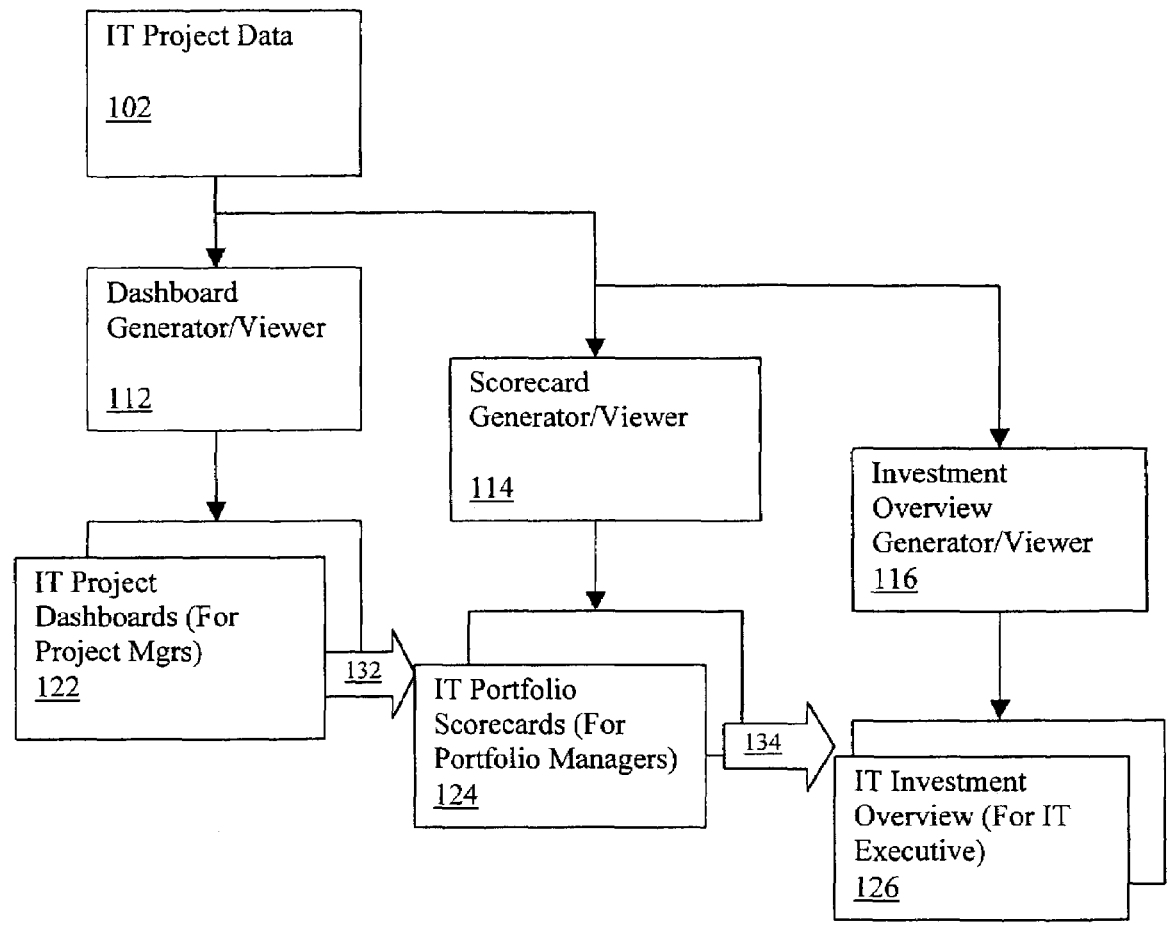
FIG. 1 illustrates an overview of the present invention, in accordance with one embodiment.

Referring now, FIG. 1, wherein a block diagram illustrating the integrated facilitation of IT management of the present invention, in accordance with one embodiment, is shown. As illustrated, in accordance with the present invention, data associated with IT projects 102 are collected and stored. More particularly, as will described in more detail below, project data 102 are associated with a number of performance metrics of IT projects. Also illustrated, in accordance with the present invention, "integrated" dashboard generator/viewer 112, scorecard generator/viewer 114 and investment map generator/viewer 116 are provided to generate IT project dashboards 122, IT portfolio scorecards 124 and IT investment mapsmap 126 respectively. IT project dashboards 122 are designed to assist IT project managers to manage their respective projects, whereas IT portfolio scorecards 124 are designed to assist "mid-level" IT portfolio mangers to manage their respective IT portfolios. IT investment map 126 in turn are designed to assist an IT executive (or its business partners) to manage the entire IT investment of his/her enterprise. More particularly, project dashboards 122, portfolio scoreboards 124 and investment maps 126 are logically integrated (as denoted by arrows 132 and 134) to facilitate more in-depth understanding of issues surfaced by investment maps 126 and by scorecards 124.

Figures 2, 3A:
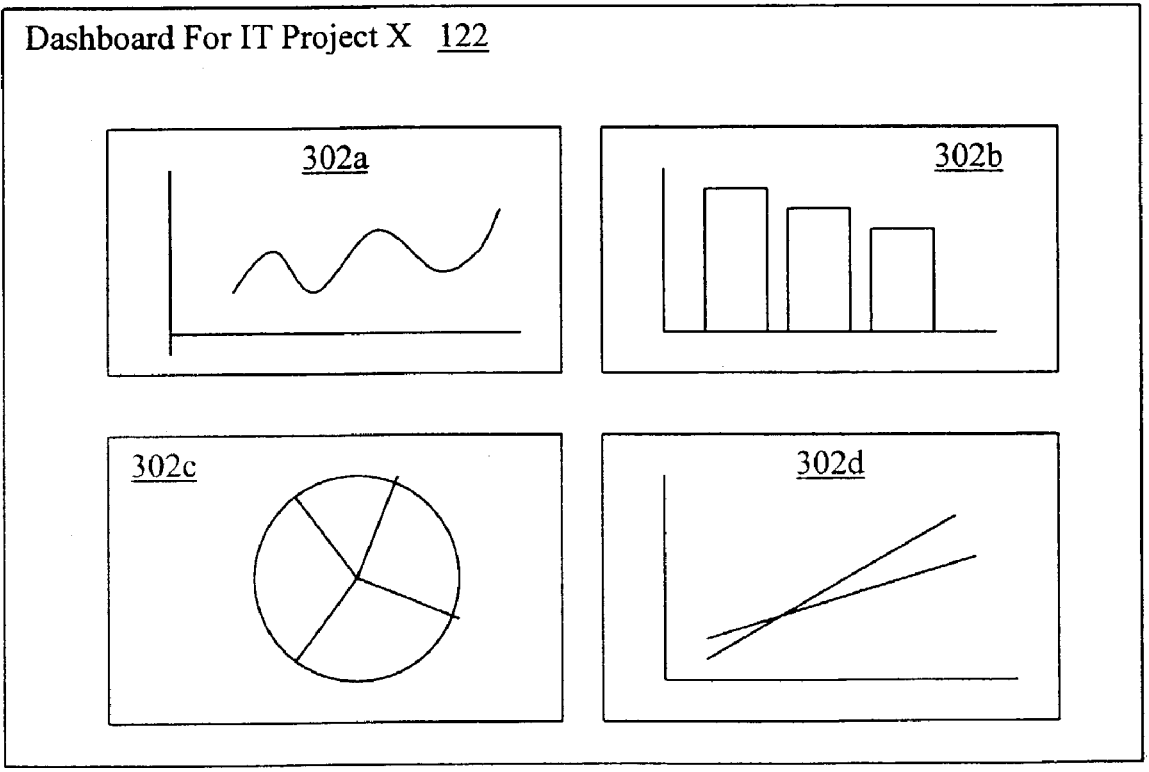
FIG. 2 illustrates an organization of project data of FIG. 1, in accordance with one embodiment.
FIGS. 3a–3c illustrate the dashboard, the scorecard and the investment map of FIG. 1, in accordance with one embodiment each.

FIG. 2 illustrates an organization of project data 102 in accordance with one embodiment. As alluded to earlier, in accordance with the present invention, project data 102 are associated with performance metrics designed to show where IT projects stand. In one embodiment, the performance metrics are key performance categories (KPC). In one embodiment, these performance metrics (or KPC) include budget metrics, staffing metrics, project size and quality metrics, and progress metrics. In one embodiment, the budget metrics include expense to budget ratios for a number of expense categories, such as personnel expenses, overhead expenses and the like. In another embodiment, the staffing metrics include current staffing level to staffing requirement ratios for a number of staffing categories, such as senior analysts, software engineers with web design skills, software engineers with C++ programming skills, engineers with networking skills and the like. In yet another embodiment, project size and quality metrics include metrics measuring the quantity of code and documentation being developed, the amount of defects encountered or removed from these code and documentation. In yet another embodiment, the progress metrics includes metrics measuring a number of task completion to schedule milestone indicators for a number of project phases, e.g. feasibility phase, design phase, unit test phase, functional test phase and system test phase. In alternate embodiments, data may also be stored for other performance metrics (or KPC) in addition to or in lieu of some or all of the above enumerated example metrics/categories.

For the illustrated embodiment, project data 102 are stored in tables 202 of a relational database, with each table storing a subset of the data (in columns) for a subset of the projects (in rows). The data may be organized into the various tables in any one of a number of application dependent manner, taking into consideration the number projects, the number of performance metrics as well as other factors. In alternate embodiments, project data 102 may also be stored employing other data organization techniques, including but not limited to flat files, hierarchical databases and the like. In one embodiment, historic data are also stored and maintained for some or all of the metrics for which data are being stored. In one embodiment, user annotations for all or selected ones of the metrics are also stored.

In one embodiment, the data to be stored, and whether historical and/or annotations are to be stored, are user defined. The user definition may be provided through any one of a number of "input dialogues" known in the art.

Figures 3B, 3C:
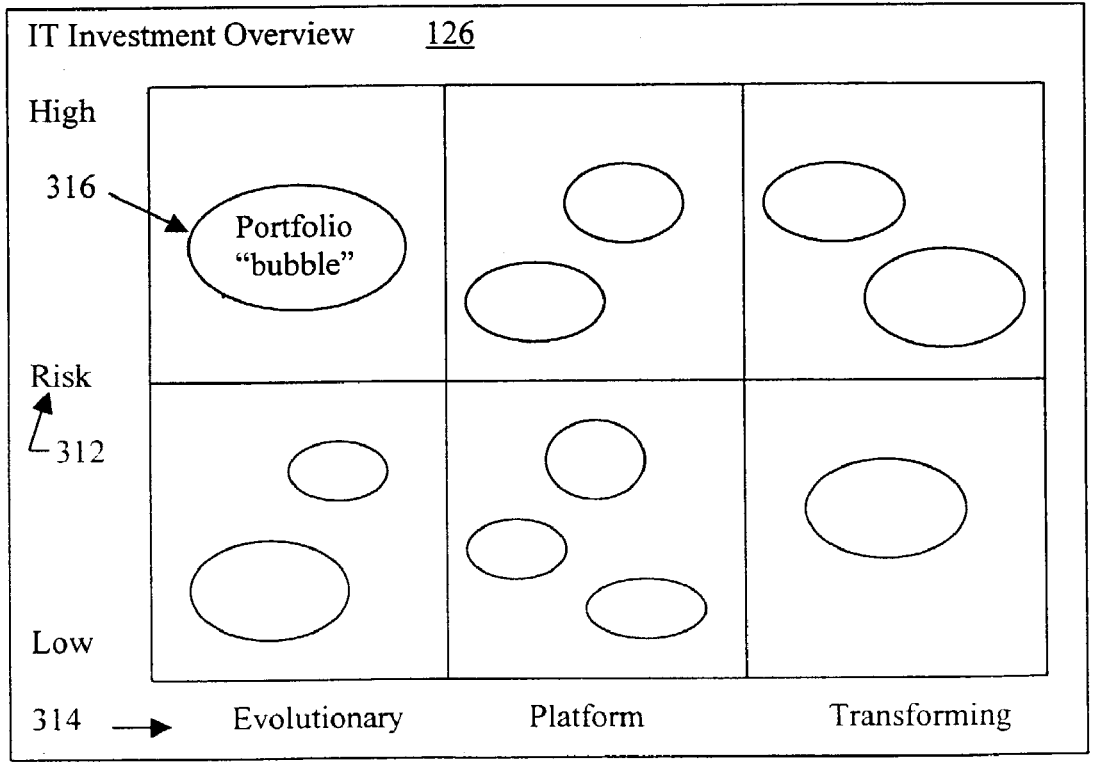

FIGS. 3a–3c illustrate a dashboard, a scorecard, and an investment map of FIG. 1 in further detail, in accordance with one embodiment each. As described earlier, dashboard 122 is designed to assist a project manager in managing a project. As shown in FIG. 3a, for the illustrated embodiment, dashboard 122 includes a number of graphical depictions 302a–302d for a number of aspects of a project (as indicated by one or more of the earlier described performance metrics). The graphical depictions 302a–302d may include the illustrated non-linear graph 302a, histogram 302b, pie chart 302c, linear graphs 302d, as well as other depictions. The various graphical depictions 302a–302d are "tiled" in the illustrated presentation. In other embodiments, the graphical depictions 302a–302d are arranged in a cascaded overlapping manner instead. Further, a dashboard 122 may present graphical depictions for multiple projects instead.

In a preferred one of the embodiments, a project manager may select the subject matters (i.e. the projects and their performance metrics/categories) to be graphically depicted, the graphical depictions to be employed, as well as the manner in which the graphical depictions are to be presented. These selections may be specified by the project manager through any one of a number of "selection dialogues" known in the art.

As described earlier, scorecard 124 is designed to assist a portfolio manager in managing the portfolio of IT projects he/she is responsible for. As shown in FIG. 3b, for the illustrated embodiment, each scorecard 124 is a tabular presentation of where the projects of a portfolio stand on various performance indicators, with measurements of the various performance indicators of the projects occupying columns 306 of corresponding rows 304. Each performance indicator may correspond to a performance metric or may be an aggregate, weighted or otherwise, of a number of performance metrics (which may or may not be individually depicted in the subject scorecard). Additionally, in lieu of conventional numerical and/or textual presentation, the measurements may be advantageously depicted in symbols 308 (in color or otherwise) to enable the current standing of a performance indicator of a project to be easily highlighted for a portfolio manager. Furthermore, for selected ones of the performance indicators, corresponding cross project composite measures are automatically computed and presented in columns of a cross project row (the top row, for the illustrated embodiment). Likewise, the cross project composite measures may be "aggregated" in a weighted or non-weighted manner, as well as presented in symbolic fashion (color or otherwise). Similarly, the contributing projects for the computation of the cross project composite measures may or may not be part of the subject scorecard. Most importantly, the presented projects are logically linked to their dashboards 122, to facilitate a portfolio manager to drill down or focus on a project if necessary.

In one embodiment, scorecards 124 may be used to present the status of portfolios of portfolios (as opposed to projects) instead. But, for ease of understanding, the remaining description will primarily focus on scorecards 124 being used to present the status of portfolios of projects.

Similar to dashboard 122, in a preferred one of the embodiments, a portfolio manager may select the projects of a portfolio and the performance indicators of the projects to be included, the manner the performance indicators are to be "aggregated", whether any cross project composite measures are to be computed, the manner in which the cross project composite measures are to be computed, as well as the manner in which the measurements are to be presented. These selections may too be specified by the portfolio manager through any one of a number of "selection dialogues" known in the art.

As also described earlier, investment maps 126 are designed to assist an IT executive in managing IT investments of his/her enterprise. As shown in FIG. 3c, for the illustrated embodiment, an investment map 126 graphically depicts a selected subset of the IT portfolios in accordance with risk, technology type, their size and their soundness. Each IT portfolio is graphically represented by a "bubble". In alternate embodiments, other graphical representations may be employed instead. The size and soundness of a portfolio are depicted by the size and color of the "bubble". The risk and technology type of the portfolio determines the placement of the "bubble", e.g. with risk determining the y-axis value and the technology type determining the x-axis value. In alternate embodiments, the technology type, risk, size and soundness may be conveyed through other visual attributes instead. Again, most importantly, the portfolios are logically linked to their scorecards 124 to facilitate an IT executive to drill down or focus on a portfolio if necessary.

In one embodiment, the technology type of each portfolio is characterized by the portfolio manager as being evolutionary in nature, or instrumental in establishing a new computing platform or technologically transforming in nature. In one embodiment, the characterization may be accomplished through quantified indices (which in turn are employed to generate the normalized x-coordinates). Similarly, the risk of each portfolio is characterized by the portfolio manager as being high, medium or low. In one embodiment, the characterization may also be accomplished through quantified indices (which in turn are employed to generate the normalized y-coordinates). In like manner, a portfolio manager also specifies how the size of a portfolio is to be measured, e.g. in terms of total dollars budgeted, total staffing, total number of lines of code to be written and so forth, as well as how "soundness" of a portfolio is to be measured, e.g. by the number of critical performance indicators in an "alert" state, or by the number of projects having at least one critical performance indicators in the "alert" state, or both. These specifications may too be made by the portfolio managers through any one of a number of "selection dialogues" known in the art.

In alternate embodiments, investment maps 126 may depict the status of a selection of IT portfolios relative to other performance metrics/categories (as opposed to risk, technology type etc.). Again, the performance metrics/categories to be referenced in the depiction of the status of IT portfolios may be user specified, through any one of a number of known "specification dialogues" known in the art.

Figure 4A:
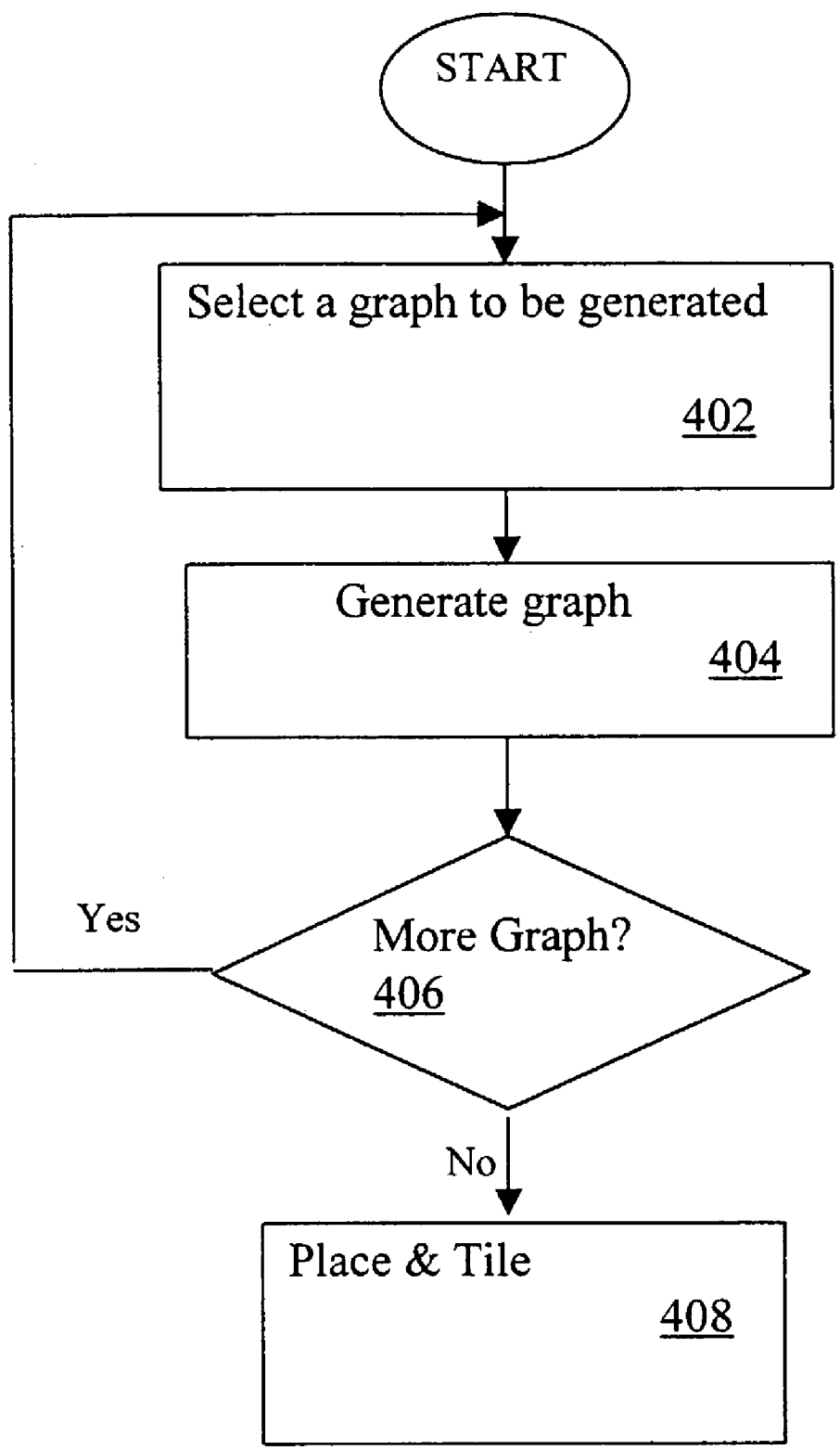
FIGS. 4a–4c illustrate the relevant operational flows of the dashboard generator/viewer, the scorecard generator/viewer, and the investment map generator/viewer of FIG. 1, in accordance with one embodiment each.
Figure 4B:
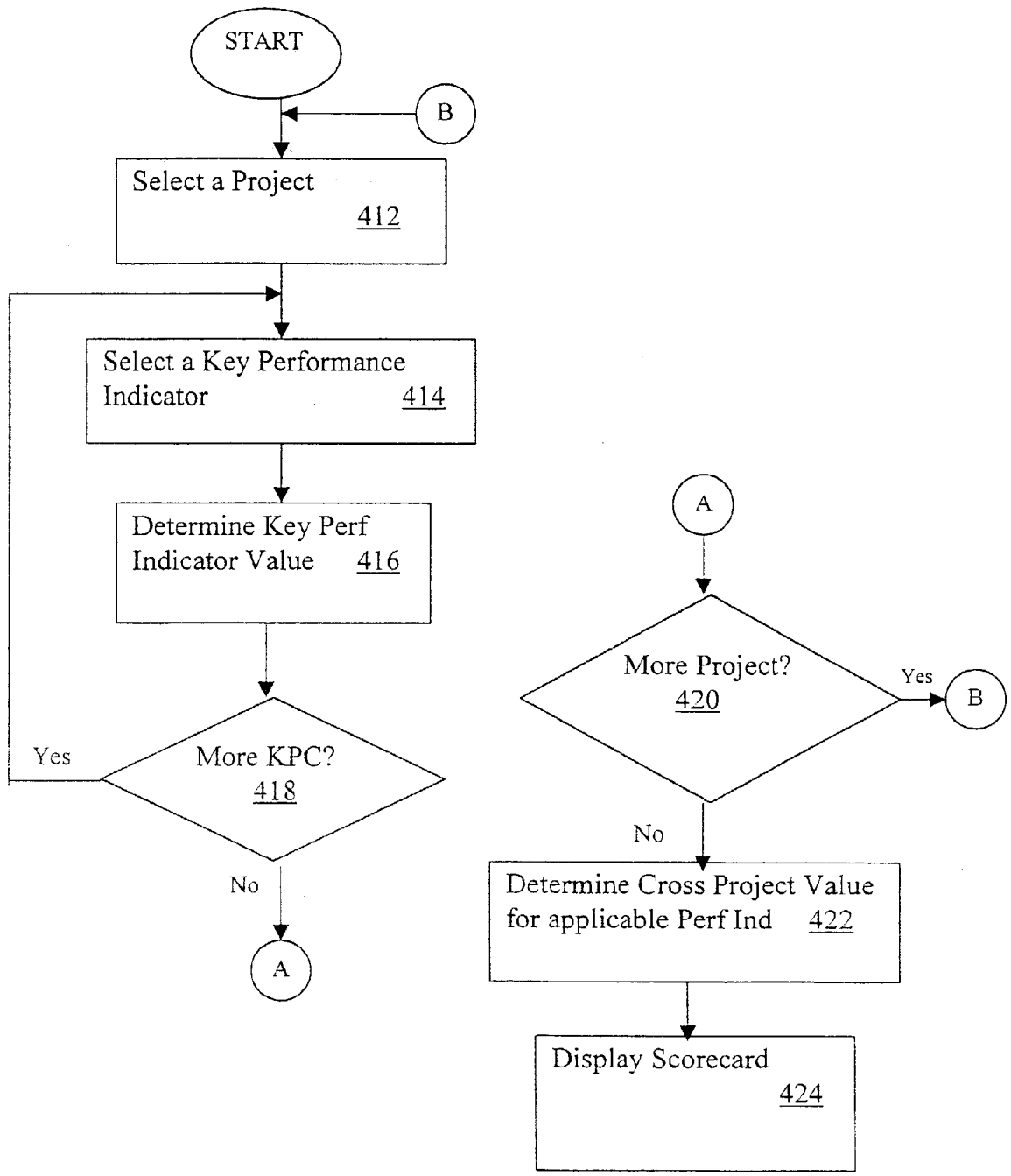
Figure 4C:
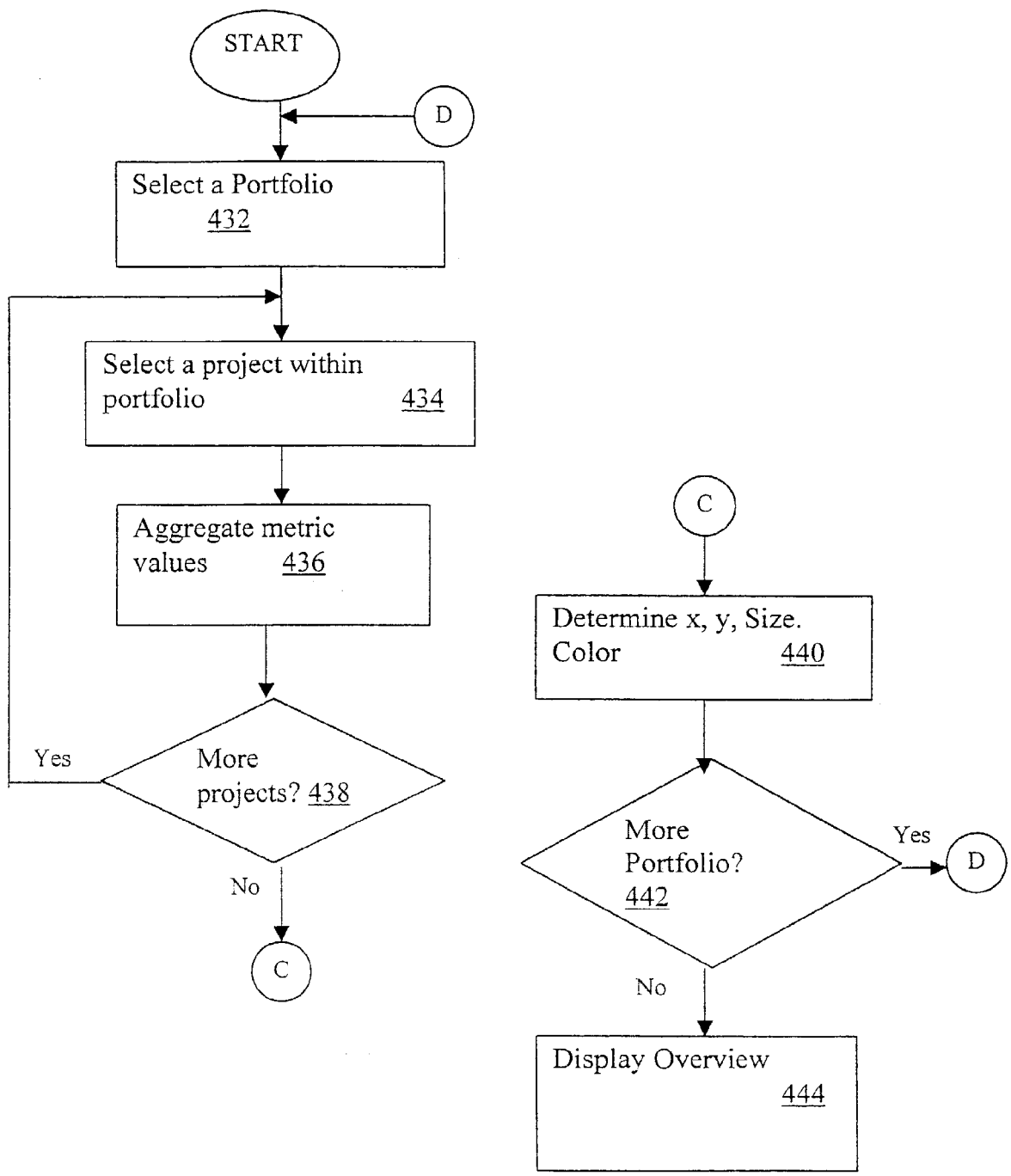

FIGS. 4a–4c illustrate the relevant generation operational flows of the dashboard generator/viewer, the scorecard generator/viewer, and investment map generator/viewer of FIG. 1, in accordance with one embodiment each. As illustrated by FIG. 4a, for dashboard generator/viewer 112, upon start of the dashboard generation process for a project, at 402, dashboard generator/viewer 122 selects one of the specified graphs for generation. At 404, dashboard generator/viewer 122 generates the selected graph for the specified performance metrics. The manner of generation is graph dependent, i.e. whether it is a histogram or a pie chart and so forth, to be generated. The generation of these types of graphs are known in the art, accordingly will not be further described. At 406, upon generation of the selected graph, dashboard generator/viewer 122 determines if additional graphs are to be generated. If so, dashboard generator/viewer 122 returns to 402, otherwise, dashboard generator/viewer 122 continues at 408, where it arranges the graphs for presentation. For the earlier described embodiment, dashboard generator/viewer 122 places and tiles the generated graphs.

As illustrated by FIG. 4b, for scorecard generator/viewer 114, upon start of the scorecard generation process for a portfolio, at 412, scorecard generator/viewer 124 selects one of the project of the portfolio for generation. At 414, scorecard generator/viewer 124 selects one of the specified performance indicators. At 416, scorecard generator/viewer 124 determines the measurement value of the selected performance indicator for the selected project. The manner of determination is performance indicator dependent. For some performance indicators, the determination may simply involve determining whether a performance metric is higher or lower than a threshold value, for others, the determination may involve any one of a number of intermediate computations such as additions, subtractions, multiplications or divisions known in the art. At 418, upon determining the measurement value of a performance indicator for a project, scorecard generator/viewer 124 determines if measurement values for additional performance indicators are to be determined. If so, scorecard generator/viewer 124 returns to 414, otherwise, scorecard generator/viewer 124 continues at 420. At 420, scorecard generator/viewer 124 determines if the portfolio has additional projects to be processed. If so, scorecard generator/viewer 124 returns to 412, otherwise, scorecard generator/viewer 124 continues at 422. At 422, scorecard generator/viewer 124 determines the cross project measure values for applicable ones of the performance indicators. Finally, at 424, scorecard generator/viewer 124 displays the generated scorecard.

As illustrated by FIG. 4c, for investment map generator/viewer 114, upon start of the map generation process, at 432, map generator/viewer 126 selects one of the portfolios for generation. At 434, map generator/viewer 126 selects a project of the selected portfolio. At 436, map generator/viewer 126 "aggregates" the performance metric values for the selected project. The manner of "aggregation" is performance metrics dependent. For some performance metrics, the "aggregation" may simply involve summation of performance metric values, for others, the "aggregation" may involve a number of intermediate transformation or normalization operations known in the art. At 438, upon aggregating the performance metrics for a project, map generator/viewer 126 determines if the selected portfolio has more projects to be processed. If so, map generator/viewer 126 returns to 434, otherwise, map generator/viewer 126 continues at 440. At 440, map generator/viewer 126 determines color of the bubble representation, to appropriately represent the soundness of the portfolio. Additionally, map generator/viewer 126 determines the size of the bubble representation, to appropriately represent the total investment of the portfolio, as well as the proper placement of the bubble representation, to appropriately depict the technology type and risk associated with the portfolio. At 442, map generator/viewer 126 determines if additional portfolios are to be processed. If so, map generator/viewer 126 returns to 432, otherwise map generator/viewer 126 continues at 444, and displays the generated map.

Figure 5A:
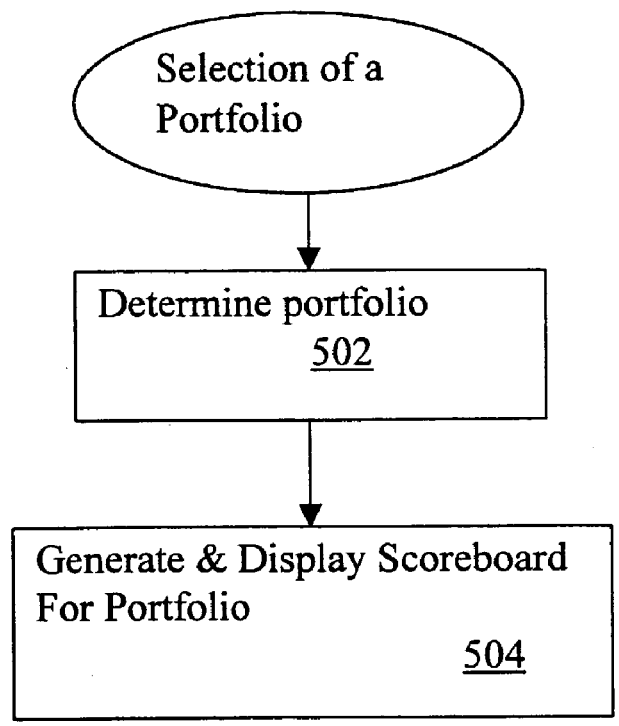
FIGS. 5a–5b illustrate additional relevant operational flows of the investment map generator/viewer and the scorecard generator/viewer of FIG. 1, in accordance with one embodiment each.
Figure 5B:
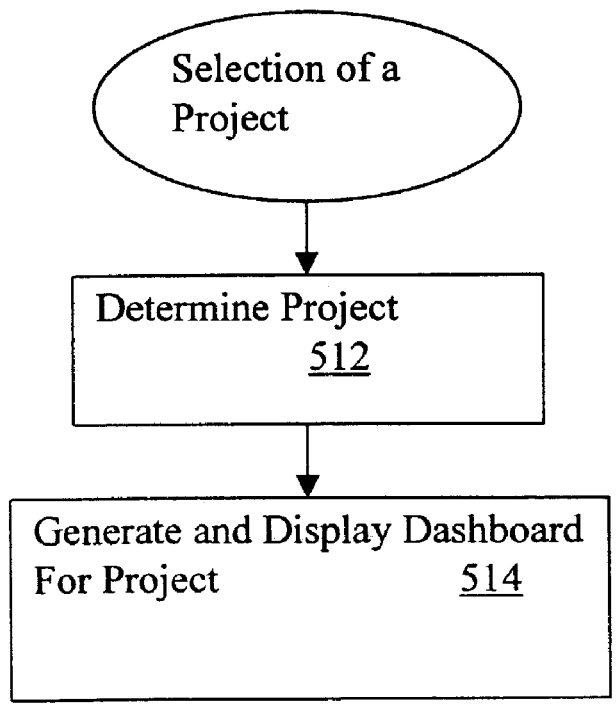

FIGS. 5a–5b illustrate the relevant viewing operational flows of the scorecard generator/viewer and investment map generator/viewer of FIG. 1, in accordance with one embodiment each. As illustrated by FIG. 5a, for map generator/viewer 116, upon being notified of the selection of a portfolio by a user (e.g. by way of clicking on the bubble representation using a cursor control device such as a mouse), map generator/viewer 116 determines the identity of the selected portfolio, 502. Upon determining the identity of the selected portfolio, at 504, map generator/viewer 116 invokes scorecard generator/viewer 114 to display the scorecard for the selected portfolio, thereby facilitating an IT executive in drilling down and focusing on a portfolio of interest.

As illustrated by FIG. 5b, for scorecard generator/viewer 114, upon being notified of the selection of a project by a user (e.g. by way of clicking on the row of a project using a cursor control device such as a mouse), scorecard generator/viewer 114 determines the identity of the selected project, 512. Upon determining the identity of the selected project, at 514, scorecard generator/viewer 114 invokes dashboard generator/viewer 112 to display the dashboard for the selected project, thereby facilitating an IT executive/a portfolio manager in drilling down and focusing on a project of interest.

Figure 6:
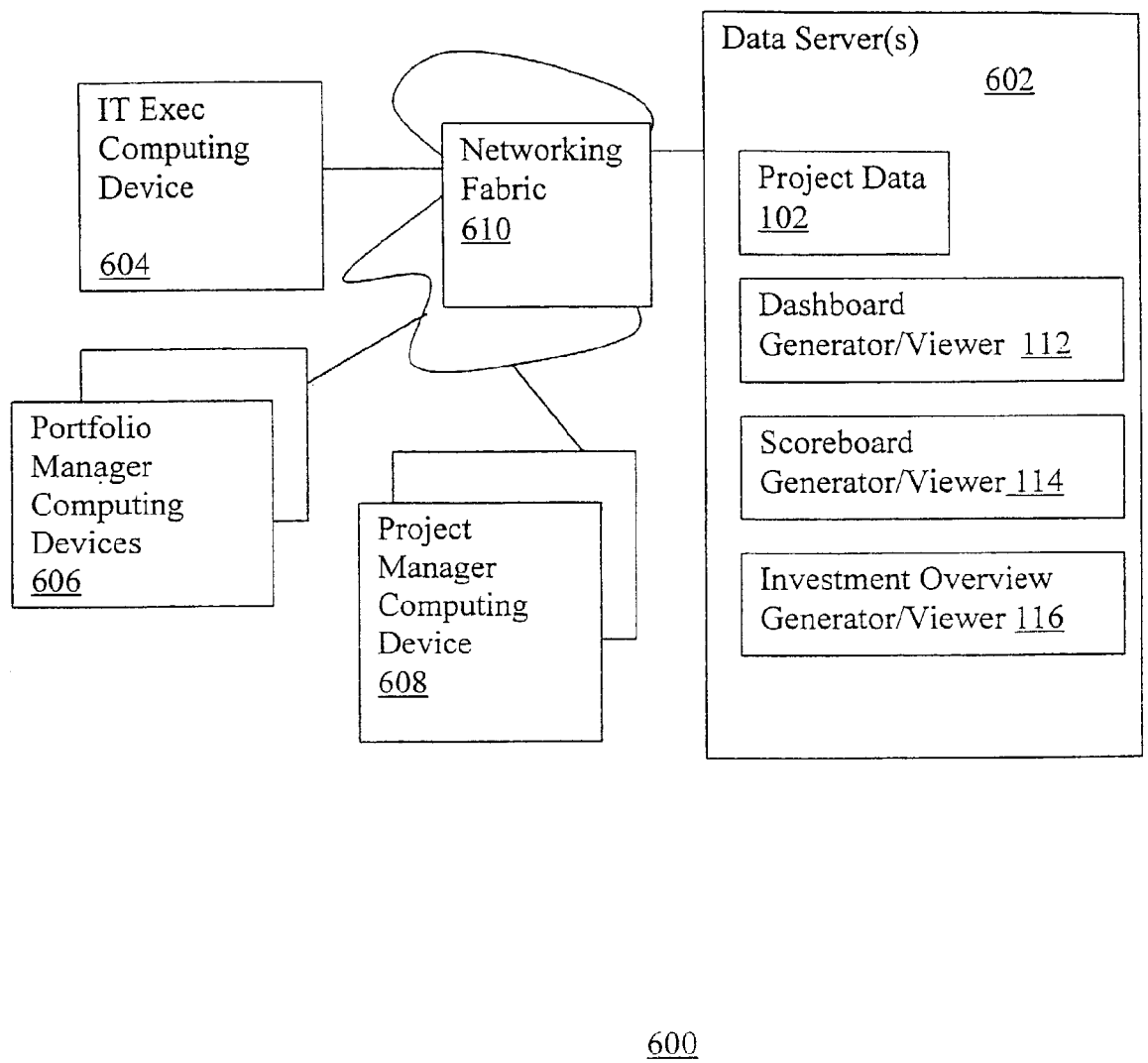
FIG. 6 illustrates a networking environment suitable for practicing the facilitation of IT management of the present invention, in accordance with one embodiment.

FIG. 6 illustrates a network environment suitable for practicing the present invention, in accordance with one embodiment. As illustrated, network environment 600 includes data server 602, IT executive computing device 604, portfolio manager computing devices 606, and project manager computing devices 608. Server 602 and computing devices 604–608 are coupled to each other via networking fabric 610. Further, server 602 and computing devices 604–608 are incorporated with the earlier described teachings of the present invention. More particularly, server 602 is employed to store project data 102, and provided with dashboard, scorecard and investment map generator/viewer 112–116 to facilitate generation and viewing of the earlier described dashboards, scorecards and investment map for an enterprise, by IT executives, portfolio managers, and project managers as described earlier, using computing devices 604–608.

Server 602 is intended to represent one or more servers coupled to each other through a local or a wide area network. In one embodiment, dashboard, scorecard and investment map generator/viewer 112–116 may execute exclusively on server 602 with the results transmitted to display on computing devices 604–608 through networking fabric 610. In other embodiments, part or all of dashboard, scorecard and investment map generator/viewer 112–116 may be executed on computing devices 604–608 instead. Further, there may be more than one executive computing device 604, as well as having computing devices that serve as a computing device with more than one role, e.g. for an IT executive as well as a portfolio manager or a project manager. Networking fabric 610 is intended to represent a wide range of interconnected private and public networks, each constituted with networking equipment such as gateways, switches, routers and the like, such as the Internet.

Figure 7:
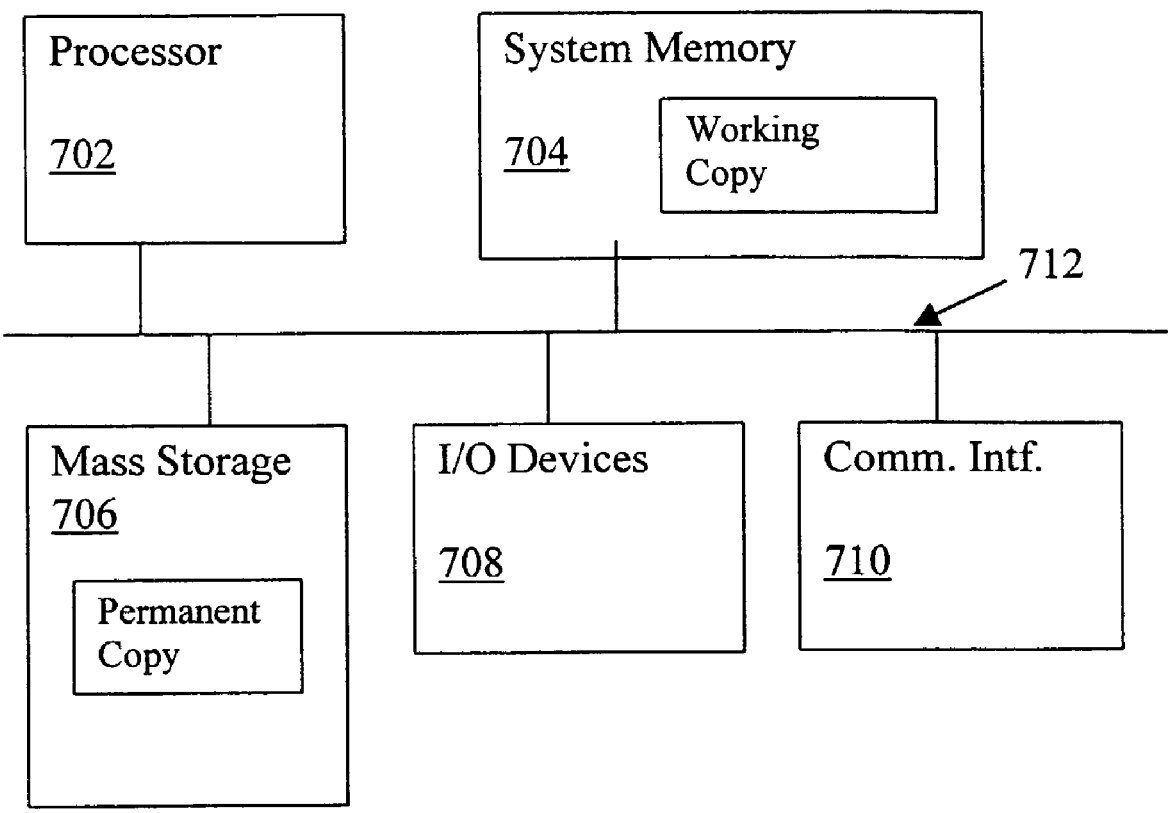
FIG. 7 illustrates a computer system suitable for use as an IT executive, a portfolio manager or a project manager's computing device or a server of FIG. 6, in accordance with one embodiment.

FIG. 7 illustrates a computer system suitable for use as either server 602 or computing devices 604–608 of FIG. 6 in accordance with one embodiment. As shown, computer system 700 includes one or more processors 702 (typically depending on whether it is used as server 602 or one of computing devices 604–608) and system memory 704. Additionally, computer system 700 includes mass storage devices 706 (such as diskette, hard drive, CDROM and so forth), input/output devices 708 (such as keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown). Each of these elements perform its conventional functions known in the art. In particular, system memory 704 and mass storage 706 are employed to store a working copy and a permanent copy of the programming instructions implementing the teachings of the present invention. The permanent copy of the programming instructions may be loaded into mass storage 706 in the factory, or in the field, as described earlier, through a distribution medium (not shown) or through communication interface 710 (from a distribution server (not shown). The constitution of these elements 702–712 are known, and accordingly will not be further described.

Thus, a novel method and apparatus for facilitating management of IT investment has been described. While the present invention has been described in terms of the above illustrated embodiments, those skilled in the art will recognize that the invention is not limited to the embodiments described. The present invention can be practiced with modification and alteration within the spirit and scope of the appended claims. For example, in addition to the above described dashboard, scorecard and investment map, the present invention may also be practiced with a "management notebook" encapsulating the various project data for a project manager, and navigationally coupling e.g. the dashboards to these "management notebooks". The description is thus to be regarded as illustrative instead of restrictive on the present invention.

What is claimed is:

1. A method comprising:

storing data associated with performance metrics of a plurality of information technology (IT) projects; and
 generating a scorecard for an IT portfolio, using said stored data, with said scorecard showing where IT projects of said IT portfolio stand on said performance metrics, said IT portfolio having a subset of said IT projects, said scorecard having a plurality of rows and columns with measures of the performance metrics of a project populating corresponding columns of a row, and at least one column having a cross project composite measure of the performance metric populated in the column of a cross project summary row.

2. The method of claim 1, wherein said measures and cross project measures of the performance metrics comprise selected ones of metric values and graphical indicators.

3. A computer program product comprising:
  a computer-readable storage medium having stored therein
    programming instructions to access stored data associated with performance metrics of a plurality of information technology (IT) projects, and
    programming instructions to generate a scorecard for an IT portfolio, using said stored data, with said scorecard showing where IT projects of said IT portfolio stand on said performance metrics, said IT portfolio having a subset of said IT projects, said scorecard having a plurality of rows and columns with measures of the performance metrics of a project populating corresponding columns of a row, and at least one column having a cross project composite measure of the performance metric populated in the column of a cross project summary row.

4. The computer program product of claim 3, wherein said measures and cross project measures of the performance metrics comprise selected ones of metric values and graphical indicators.

* * * * *

UNITED STATES PATENT AND TRADEMARK OFFICE
CERTIFICATE OF CORRECTION

PATENT NO.        : 7,158,940 B2
APPLICATION NO.   : 10/459113
DATED             : January 2, 2007
INVENTOR(S)       : John Cimral et al.

It is certified that error appears in the above-identified patent and that said Letters Patent is hereby corrected as shown below:

In Column 1, Line 22, before "computer", insert --the --.

In Column 1, Line 36, replace "were" with --was--.

In Column 1, Line 45, replace "broaden" with --broadened--.

In Column 1, Lines 50-53, replace "not only the success of increasing number of conventional business enterprises are increasingly dependent on the success of their IT projects" with --not only are an increasing number of conventional business enterprises increasingly dependent on the success of their IT projects--.

In Column 1, Line 54, before "e-commerce", insert --and --.

In Column 1, Line 62, replace "little" with --few--.

In Column 3, Line 20, replace "computer system include" with --'computer system' includes--.

In Column 3, Line 30, replace "now," with --now to --.

In Column 3, Line 35, after "will", insert --be --.

In Column 3, Line 42, replace "mapsmap" with --map--.

In Column 3, Line 47, replace "map" with --maps--.

In Column 3, Line 48, replace "its" with --his/her--.

In Column 4, Line 8, replace "includes" with --include--.

In Column 4, Lines 20-21, replace "application dependent manner" with --application-dependent manners--.

In Column 4, Line 21, after "number", insert --of --.

In Column 4, Line 25, after "but ", insert --not --.

In Column 4, Line 26, replace "historic" with --historical--.

In Column 5, Line 22, delete "of portfolios " the second time it occurs.

UNITED STATES PATENT AND TRADEMARK OFFICE
CERTIFICATE OF CORRECTION

| | |
|---|---|
| PATENT NO. | : 7,158,940 B2 |
| APPLICATION NO. | : 10/459113 |
| DATED | : January 2, 2007 |
| INVENTOR(S) | : John Cimral et al. |

It is certified that error appears in the above-identified patent and that said Letters Patent is hereby corrected as shown below:

In Column 6, Line 6, replace "indicators" with --indicator--.

In Column 6, Line 30, after "art," insert --and --.

In Column 6, Line 40, replace "124" with --114--.

In Column 6, Line 41, replace "project" with --projects--.

In Column 6, Line 42, replace "124" with --114--.

In Column 6, Line 44, replace "124" with --114--.

In Column 6, Line 54, replace "124" with --114--.

In Column 6, Line 56, replace "124" with --114--.

In Column 6, Line 57, replace "124" with --114--.

In Column 6, Line 58, replace "124" with --114--.

In Column 6, Line 60, replace "124" with --114--.

In Column 6, Line 61, replace "124" with --114--.

In Column 6, Line 62, replace "124" with --114--.

In Column 6, Line 64, replace "124" with --114--.

In Column 6, Line 67, replace "114" with --116--.

In Column 7, Line 1, replace "126" with --116--.

In Column 7, Line 2, replace "126" with --116--.

In Column 7, Line 3, replace "126" with --116--.

In Column 7, Line 12, replace "126" with --116--.

In Column 7, Line 13, replace "126" with --116--.

In Column 7, Line 14, replace "126" with --116--.

UNITED STATES PATENT AND TRADEMARK OFFICE
CERTIFICATE OF CORRECTION

PATENT NO. : 7,158,940 B2
APPLICATION NO. : 10/459113
DATED : January 2, 2007
INVENTOR(S) : John Cimral et al.

It is certified that error appears in the above-identified patent and that said Letters Patent is hereby corrected as shown below:

In Column 7, Line 15, replace "126" with --116--.

In Column 7, Line 16 before "color", insert --the --.

In Column 7, Line 18, replace "126" with --116--.

In Column 7, Line 24, replace "126" with --116--.

In Column 7, Line 25, replace "126" with --116--.

In Column 7, Line 26, replace "126" with --116--.

In Column 7, Line 65, replace "generator/viewer" with --generator/viewers--.

In Column 7, Line 67, replace "scorecard" with --scorecards--.

In Column 8, Line 7, replace "generator/viewer" with --generator/viewers--.

In Column 8, Line 11, replace "generator/viewer" with --generator/viewers--.

In Column 8, Line 35, replace "perform" with --performs--.

In Column 8, Line 43, replace "(from" with --from--.

In Column 8, Line 55, replace "map," with --maps,--.

Signed and Sealed this

Twentieth Day of March, 2007

JON W. DUDAS
*Director of the United States Patent and Trademark Office*